W. G. RAOUL.
Air-Brake.
No. 203,647. Patented May 14, 1878.
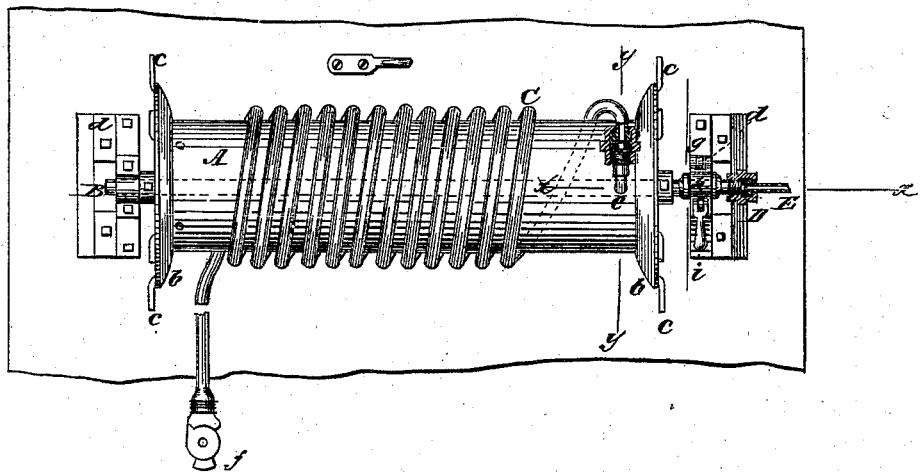
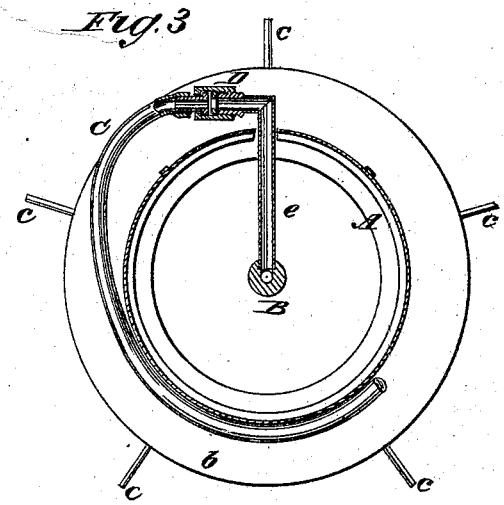
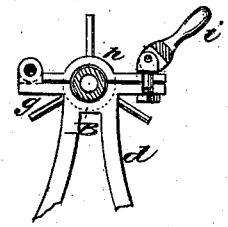
WITNESSES:
Francis McArdle.
C. Sedgwick
INVENTOR:
W. G. Raoul
BY Munn & Co
ATTORNEYS.

UNITED STATES PATENT OFFICE.

WILLIAM G. RAOUL, OF MACON, GEORGIA.

IMPROVEMENT IN AIR-BRAKES.

Specification forming part of Letters Patent No. 203,647, dated May 14, 1878; application filed April 22, 1878.

*To all whom it may concern:*

Be it known that I, WILLIAM G. RAOUL, of Macon, in the county of Bibb and State of Georgia, have invented a new and useful Improvement in Air-Brakes, of which the following is a specification:

Figure 1 is a plan view of my improved apparatus. Fig. 2 is a side elevation, in section, taken on line $x\,x$ in Fig. 1. Fig. 3 is a transverse section taken on line $y\,y$ in Fig. 1. Figs. 4 and 5 are detail views.

Similar letters of reference indicate corresponding parts.

My invention relates to a device for adapting air-brakes as now used under the several existing patents to mixed trains, or to render it possible for freight or other cars not supplied with air-brake attachments to intervene between the engine and such cars as may be supplied with air-brake attachments without rendering the air-brake inoperative.

Referring to the drawing, A is a cylinder, which is provided with end flanges $b$, and with radiating handles $c$, that project from the periphery of the flanges. This cylinder is secured to a shaft, B, which extends through it, and is journaled in standards $d$ that are secured to the roof of the car; or, if more desirable, the cylinder to be located inside the car, with suitable openings in top or end of car, through which to pass the hose. One end of the shaft B is bored axially, and a pipe, $e$, which is screwed into it at right angles, extends through the side of the cylinder A, and has an elbow, which is connected by means of an ordinary screw-coupling with the hose C, which is wound upon the cylinder. This hose is of sufficient length to extend along the tops of several cars, and is provided at its free end with a coupling, $f$, by which it is connected with the air-pipe of the tender, thereby forming a connection between the hose and the system of pipes under the tender and the reservoir or air-pump of the engine. The bored end of the shaft B turns in a box, $g$, the upper half $h$ of which is hinged at one side, and engaged by an eccentric lever, $i$, at the other side, which is pivoted to an eyebolt extending through the lower half of the box, and is capable of closing down the upper half of the box with more or less force upon the bearing of the shaft B, so as to check the rotation of the cylinder A as the hose is unwound from it. The pressure on the shaft created in this manner is sufficient to prevent the accidental turning of the cylinder A, but will permit it to turn when extraordinary power is applied to the hose, as in the case of the separation of the cars. The bored end of the shaft B is connected, by means of a properly-packed screw-coupling, D, or an ordinary stuffing-box, with a pipe, E, that is bent at right angles and extends downward through the car, and is connected with the air-supply pipes of the braking apparatus carried by the car.

The hose carried by the cylinder A, when used, is extended over, through, under, or by the side of cars which are not provided with brakes, and may be connected with the usual air-brake coupling under the tender-buffer, which is connected with the air reservoir and pumps of the engine, thus forming a complete connection between the pump and reservoir of the engine and the pipe system under the brake-cars of the train.

Having thus described my invention, I claim as new and desire to secure by Letters Patent—

1. The method of operating air-brakes in a mixed train by the employment of hose to conduct air over, through, or by such cars as are not provided with air-brake apparatus, substantially as herein shown and described.

2. The cylinder A, mounted in suitable supports, and having a hollow journal, which is in communication with the air-supply pipe of the braking apparatus and with the hose wound upon the cylinder, substantially as herein shown and described.

3. The cylinder A, having the hollow journal and pipe $e$, the hose C, fixed pipe E, and coupling D, in combination, substantially as shown and described.

WILLIAM GREENE RAOUL.

Witnesses:
W. L. BOSS,
T. G. HOLT.